June 24, 1947.  G. A. CLAUSON ET AL  2,422,824
DYNAMOELECTRIC MACHINE
Filed April 8, 1943  3 Sheets-Sheet 1

Inventors
Gustav A. Clauson and
Rupert N. Early
By Akel C. Benson
Attorney

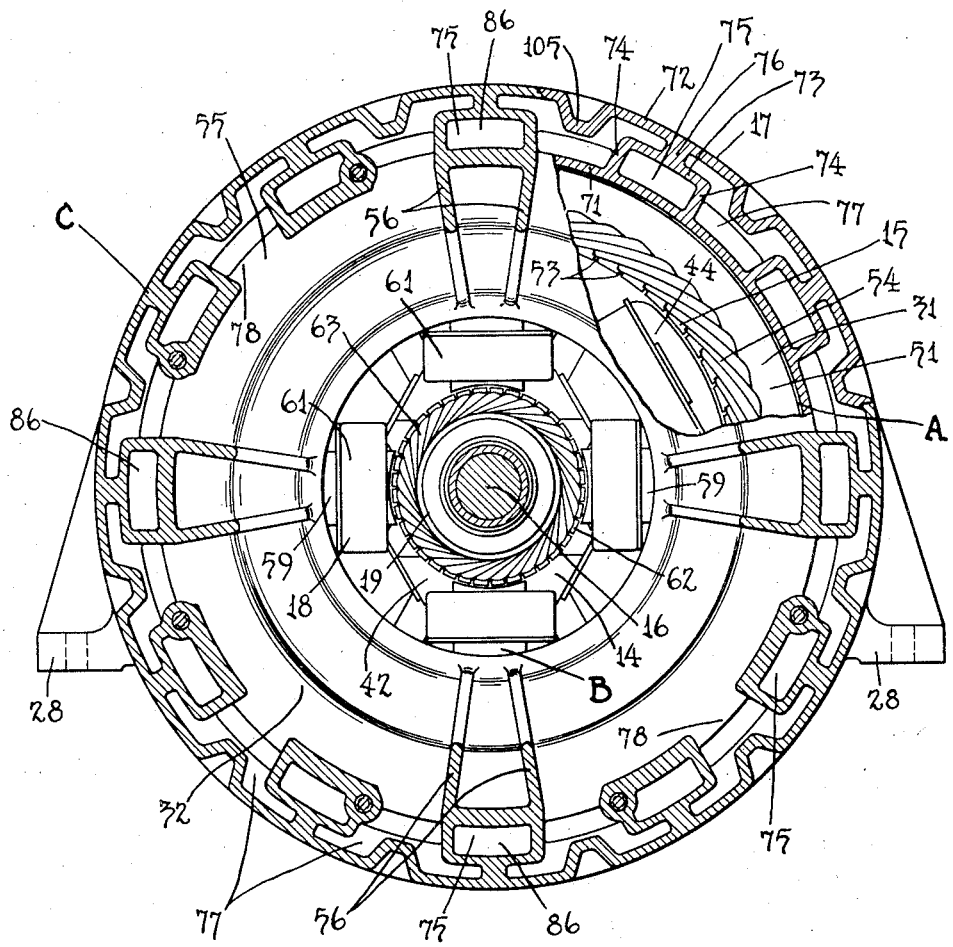

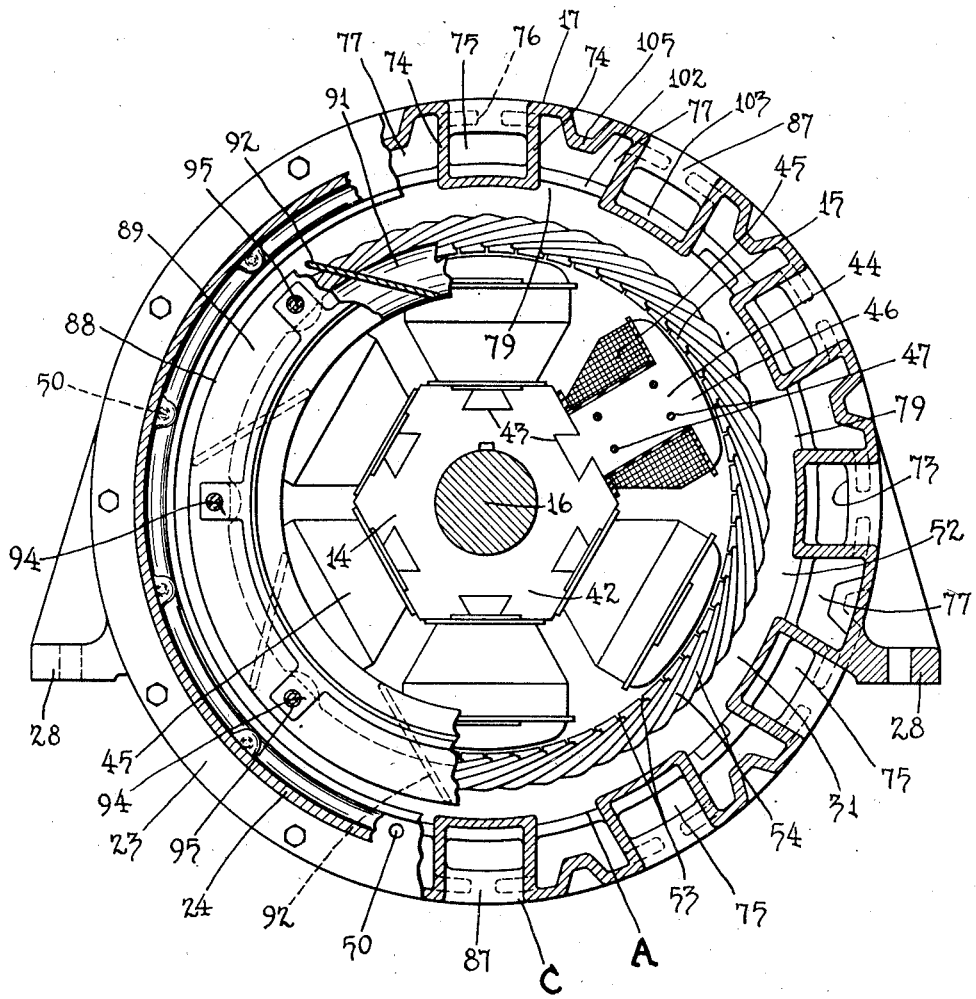

Patented June 24, 1947

2,422,824

UNITED STATES PATENT OFFICE 2,422,824

DYNAMOELECTRIC MACHINE

Gustav A. Clauson, Highland Park, and Rupert N. Early, Minneapolis, Minn., assignors to Electric Machinery Mfg. Company, Minneapolis, Minn.

Application April 8, 1943, Serial No. 482,274

12 Claims. (Cl. 171—252)

Our invention relates to dynamoelectric machines and has for an object to provide a fully-enclosed machine of the ventilated type of no greater dimensions than the conventional open-type machine of the same output.

Another object of the invention resides in providing a fully enclosed machine which may be built up from the cores, rotors and other parts of conventional open-type machines without reducing the output thereof.

An object of the invention resides in providing a dynamoelectric machine having an annular frame in which heat dissipating passageways are provided for recirculating the air within the machine and in which other passageways are provided for circulating fresh air which are disposed in heat transfer relation with respect to said first passageways.

A still further object of the invention resides in arranging said passageways axially and in juxtaposition and in causing flow of air in said first passageways in the opposite direction with respect to the direction of flow of the air in the second passageways.

An object of the invention resides in arranging the passageways so that the fresh air passageways are adjacent the core and so that the recirculated air passageways are in heat-transfer relation with the exterior surrounding air.

A still further object of the invention resides in utilizing a portion of the surface of the stator core as a portion of the walls of the fresh air passageways whereby the fresh air comes in direct contact with a portion of the surface of the core.

An object of the invention resides in constructing the frame to provide a great heat exchange area within predetermined frame dimensions.

Another object of the invention resides in the specific construction of the frame whereby the desired heat exchange surfaces are procured.

An object of the invention resides in utilizing two blowers, one for moving the recirculated air and the other for moving the fresh air, and in positioning said blowers at opposite ends of the machine.

Another object of the invention resides in providing the dynamoelectric machine with an exciter and in providing a single cooling system for cooling both the exciter and the dynamoelectric machine proper.

A still further object of the invention resides in providing an end bell at each end of the machine for enclosing the same and in supporting the stator of the exciter by one of the end bells.

Another object of the invention resides in providing an annulus spaced from one of the end bells and in supporting the stator of the exciter by said annulus.

An object of the invention resides in providing an end cap for one end of the machine spaced from the corresponding end bell to form a fresh air chamber and in positioning one of said blowers within said fresh air chamber.

Other objects of the invention reside in the novel combination and arrangement of parts and in the details of construction hereinafter illustrated and/or described.

In the drawings:

Fig. 2 is an elevational sectional view taken on line 2—2 of Fig. 1.

Fig. 3 is an elevational sectional view taken on line 3—3 of Fig. 1.

Figure 1:
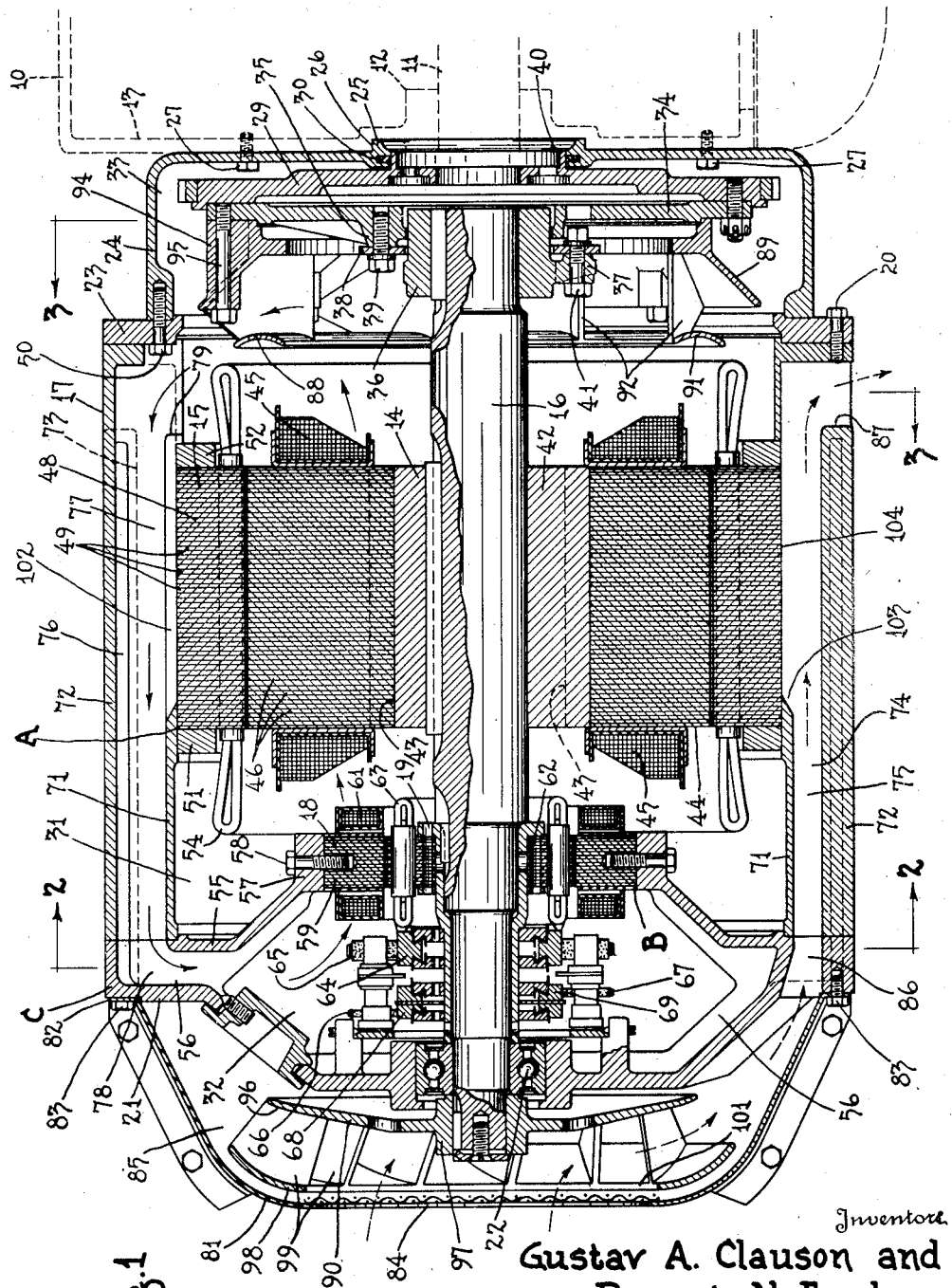
Fig. 1 is an elevational longitudinal sectional view of a dynamoelectric machine illustrating an embodiment of our invention.

Our invention is particularly adapted to be used as a generator for direct connection to an engine and in order to illustrate the same, a portion of an engine 10 has been shown in dotted lines in Fig. 1. This engine has a crankshaft 11 journaled in a bearing 12 carried by the end wall 13 of the engine. Inasmuch as the construction of the engine forms no feature of the present invention, the same has not been shown in detail in this application.

Our invention comprises a dynamoelectric machine proper indicated in its entirety by the reference character A, which includes a rotor 14 and a stator 15. The rotor 14 is carried by a shaft 16, while the stator 15 is mounted in an annular frame 17. Associated with the dynamoelectric machine A is an exciter B. This exciter includes a stator 18 supported by the frame 17 and a rotor 19 mounted on the shaft 16. In conjunction with the dynamoelectric machine A and the exciter B, we utilize a cooling system C which maintains the said dynamoelectric machine and exciter within the proper working temperatures. These various parts will now be described in detail.

The frame 17 has an end bell 21 secured to one end thereof by means of cap screws 82 which end bell has mounted in it a bearing 22 for the outer end of shaft 16. The other end of the frame 17 has affixed to it by cap screws 20 an annular adapter 23 which has attached to it by cap screws 50 an end bell 24. By means of this construction, a compartment 31 is formed within the frame 17 and end chambers 32 and 33 are formed within the end bells 21 and 24, respectively. End bell 24 is formed with a shoulder 25 which is received within a recess 26 in the wall 13 of engine 10. Cap screws 27 passing through the end bell 24 and screwed into the wall 13 serve to hold the entire machine attached to the engine. The frame 17 is partly supported through the end bell 24 from the engine proper and is further supported by means of two feet 28 which are cast on the frame 17 and which rest upon suitable supports not shown.

Attached to the crankshaft 11 of engine 10 is a flywheel 29 which is disposed within the chamber 33 in the end bell 24. This flywheel has bolted to it a spider 34 which is provided with spaced bosses 35. A hub 36, keyed to the shaft 16, is provided with similarly formed bosses 37 which are staggered with reference to the bosses 35. A flexible ring 38 is alternately bolted to the bosses 35 and 37 by means of cap screws 39 and bolts 41 and forms a flexible connection between the crankshaft 11 and the shaft 16.

In order to prevent leakage of oil from the engine 10 and to the end chamber 33 of the dynamoelectric machine A, an oil seal 39 is provided which cooperates with a sleeve 40 issuing outwardly from the flywheel 29.

The rotor 14 of the dynamoelectric machine A is best shown in Figs. 1 and 3 and includes a hub 42 which is keyed to the shaft 16. This hub is constructed with a number of axially extending dovetailed slots 43 which are adapted to receive the dovetails of a corresponding number of poles 44. In the particular machine disclosed, there are six such poles and each pole has a winding 45 thereon. The poles 44 may be secured in place on the hub 42 by means of any suitable construction such as is now well known in the art. The poles 44 are preferably constructed of laminations 46 which are held together by means of rivets 47.

The stator 15 consists of an annular core 48, best shown in Fig. 1, and formed of laminations 49 which are clamped between two end rings 51 and 52. The said core has slots 53 therein in which are disposed windings 54.

Integral with the end bell 21 is an annulus 55 which is spaced from said end bell and secured thereto through a number of webs 56. This annulus is formed with a ring 57 to which is attached by means of cap screws 58 a number of poles 59 forming the stator 18 of exciter B. These poles have mounted on them coils 61. Attached to the shaft 16 and within the poles 59 is a laminated core 62 which is provided with windings 63. This structure forms the rotor 19 of the said exciter. The windings 63 are connected to a commutator 64 mounted on shaft 16. Brushes 65, carried by the end bell 21, ride on the commutator 64 and deliver the current generated by said exciter to other brushes 66 and 67 which ride upon collector rings 68 and 69 mounted on shaft 16. These rings are connected by means of conductors, not shown, with the windings 45 of the rotor 14.

The cooling system C includes means for recirculating the air within the dynamoelectric machine and also means for circulating fresh air to cool the recirculated air. The frame 17 of the invention forms an important part of both the elements of the cooling system C. This frame is annular in form, as best shown in Fig. 2 and consists of an inner circumferential wall 71 and an outer circumferential wall 72 concentric relative thereto and spaced therefrom. The wall 71 snugly receives the core 48 of stator 15 and the end rings 51 and 52 of said stator are secured to the wall 71 by welding or otherwise. Between the two walls 71 and 72 are arranged a number of spaced elongated axially extending circumferentially disposed walls 73. These walls are connected to the wall 71 by means of radial walls 74 and together form elongated passageways 75 which are used for conducting fresh air through the machine as will be presently more fully described. The outer circumferential wall 72 is connected to the walls 73 by means of webs 76 which form passageways 77 arranged in alternation with the passageways 75 and through which the air within the compartment 31 is circulated. These passageways partly surround the passageways 75 and the walls thereof are in heat-transfer relation with respect to the core 48, the walls of the passageways 75 and with the air upon the exterior of the machine. The passageways 77 communicate with passageways 78 in the end bell 21 which communicate with the end chamber 32. The said passageways 77 at their other ends communicate through openings 79 in the inner circumferential wall 71 with the interior of the compartment 31 and the end chamber 33.

Attached to the outermost portion of the end bell 21 is a cap 81 which is formed with a flange 82 secured to said end bell by means of the cap screws 83. This cap has an air inlet 84 in the center of the same and forms in conjunction with the end bell 21 a fresh air chamber 85. The passageways 75 communicate with passageways 86 which extend through the end bell 21 and are thus in communication at one end with the fresh air chamber 85. The other ends of the passageways 75 communicate with openings 87 which extend through the outer circumferential wall 72 of frame 17 and bring the other ends of said passageway in communication with the exterior.

Attached to the flywheel 29 of engine 10 and located within the end chamber 33 is a blower or fan 88. This blower consists of a disk 89 and an annulus 91 between which are arranged a number of angularly-disposed blades 92, best shown in Fig. 3. The disk 89 has bosses 94 formed thereon. Bolts 95 extend through said bosses and are threaded into spider 34 which is attached to flywheel 29, thus holding the blower 88 securely attached to shaft 16. As the said shaft rotates, the blower draws air through the space between the poles 44 of the rotor 14, discharges the same upwardly and into the openings 79 of passageway 77. The air so discharged follows along these passageways and returns through the passageways 78 and into the end chamber 32. From this end chamber, the air passes around the current-collecting device of the exciter B and between the poles 59 of the same. The air thus travels toward the right as viewed in Fig. 1 through the exciter B and the dynamoelectric machine proper A and then towards the left through the passageways 77, making a complete circuit, as indicated by the full-line arrows in said figure. Inasmuch as the air within the compartment 31 and the end chambers 32 and 33 is confined by the end bells 21 and 24, the said air does not escape from the machine nor does air from the exterior enter into this space. This air is hence recirculated through the machine and has been referred to as the recirculated air.

Attached to the end of the shaft 16 is a blower 90 similar to the blower 88 which consists of a disk 96 which is attached to a hub 97 and by means of which the blower is secured to the shaft 16. The blower 90 further includes an annulus 98 which is spaced from the disk 96. Between this disk and annulus are arranged a number of blades 99 similar to the blades 92. The annulus 98 has a central opening 101 therein which registers with the fresh-air inlet 84 in cap 81. When the shaft 16 rotates, air is drawn inwardly into the fresh air chamber 85 through the air inlet 84 and discharged outwardly by the blower 90 to the outer portion of the fresh air chamber 85. From this chamber, the air leaves by means of passageways 86 in end bell 21 and enters the passageways 75. The air is finally discharged out of the machine through the openings 87. This air has been referred to as the fresh air and its course through the machine is indicated by dotted arrows in Fig. 1.

In order to obtain maximum cooling, the circumferential wall 71 of frame 17 is formed with openings 102 and 103 which causes the air flowing through the passageways 77 and 75 to flow directly past the outer surface 104 of core 48 of dynamo electric machine A. Thus heat is directly transferred from said core to the fresh air flowing through the passageways and increases the thermal efficiency of the cooling system.

The operation of the invention is as follows: When the machine is in operation, the air within the compartment 31 is circulated toward the left as viewed in Fig. 1, through pasageways 77. At the same time, the fresh air is circulated toward the right as viewed in Fig. 1, through the passageways 75 and discharged from the machine. It will thus be noted that the two air currents flow in opposite directions. Due to the fact that the air currents flowing through the passageways 77 are hottest on leaving the said passageways, greater heat absorption is required at the ends of said passageways. This is procured by directing the fresh air into the passageways 75 at the locality of the ends of the passageways 77. Thus the air passing through the exciter B has first been cooled the maximum amount. When the fresh air reaches the outlet openings 87, the same has been heated the maximum amount and is discharged from the machine at the locality of highest temperature of the recirculated air. In this manner, extremely great thermal efficiency of the cooling system C is procured. It will be noted that the passageways 75 which conduct the fresh air through the machine are innermost and that the passageways 77 are arranged exteriorly of the passageways 75. Since the heat transfer is from the passageways 77 to the exterior and to the air within the passageways 75, the passageways 77 have the greatest heat transfer area at the outer surface of the machine, while the passageways 75 receiving heat from the air in the passageways 77 and not being required to dispense the heat to the exterior, are confined to the interior of the frame. In this manner, the thermal efficiency of the cooling system C is further increased.

To still further increase the area of the heat transfer surface of the passageways 77, corrugations 105 are formed in the outer circumferential wall 72 of frame 17 which corrugations are disposed between the webs 76 and between the radial walls 74 of adjacent passageways 75. It will thus be seen that fresh air is continuously used to cool the operating parts of the dynamoelectric machine without directly coming in contact with any of the moving parts thereof. This prevents dust and foreign matter from being collected within the machine.

By constructing dynamoelectric machines in accordance with my invention, it has been possible to use the same size of core and use the other standard parts of a conventional open-type of dynamoelectric machine without increasing the size thereof. Thus, machines constructed in accordance with my invention are interchangeable with the standard conventional open-type machines and may be attached to the engines with which such machines are employed or may be mounted in place of the conventional machines wherever the same are located.

The advantages of our invention are manifest. A machine of the same rating as the conventional open-type machine may be produced without increase in size or change of dimensions. Our invention may be substituted for the conventional open-type machine without change or alteration. With our invention, external air is prevented from entering the interior of the machine, thereby preventing injury due to dust and foreign matter usually entering the open-type of machine. With our invention, the machine may be made practically waterproof and the danger of explosion will be greatly reduced.

Changes in the specific form of our invention, as herein described, may be made within the scope of what is claimed without departing from the spirit of our invention.

Having described our invention, what we claim as new and desire to protect by Letters Patent is:

1. In a dynamoelectric machine, a rotor, a stator encircling said rotor, one thereof having axially extending openings therethrough, a housing having a compartment enclosing said stator and rotor and comprising an annular frame encircling said stator, said frame having axially extending recirculated air passageways, an end bell at one end of the frame and forming therewith an end chamber communicating with said compartment, a second end bell at the other end of the frame, an annulus spaced from said second end bell and forming in conjunction therewith a second end chamber, an exciter having axially extending openings therethrough and including a stator carried by said annulus and disposed interiorly of said dynamoelectric machine, a blower revoluble with said motor and disposed in the other end chamber, said blower causing circulation of air within the interior of said dynamoelectric machine through said recirculated air passageways and through the openings in said exciter and the axially extending openings of the dynamoelectric machine said second end bell and said annulus directing the air entering said second end chamber to the openings in said exciter and means for causing circulation of air exteriorly of the said housing and through said fresh air passageways.

2. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of elongated axially extending walls circumferentially arranged adjacent one another in spaced relation and disposed between said circumferential walls and radially spaced therefrom, pairs of radial walls connecting said first circumferential wall with said elongated walls at their adjacent edges to form fresh air passageways therebetween, webs connecting said second circumferential wall and said elongated walls intermediate their adjacent edges to form recirculated air passageways between said second and first circumferential walls and between said second circumferential wall and said elongated walls, and means for causing circulation through said passageways.

3. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of spaced elongated axially extending walls disposed between said circumferential walls and spaced therefrom, radial walls connecting said first circumferential wall with said elongated walls to form fresh air passageways therebetween, webs connecting said second circumferential wall and said elongated walls to form recirculated air passageways between said second and first circumferential walls and between said second circumferential wall and said elongated walls, said second circumferential wall having axially extending corrugations therein disposed between said webs, and means for causing circulation through said passageways.

4. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of spaced elongated axially extending walls disposed between said circumferential walls and spaced therefrom, radial walls connecting said first circumferential wall with said elongated walls to form fresh air passageways therebetween, webs connecting said second circumferential wall and said elongated walls to form recirculated air passageways between said second and first circumferential walls and between said second circumferential wall and said elongated walls, said second circumferential wall having axially extending corrugations therein disposed between certain of said radial walls, and means for causing circulation through said passageways.

5. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of spaced elongated axially extending walls disposed between said circumferential walls and spaced therefrom, radial walls connecting said first circumferential wall with said elongated walls to form fresh air passageways therebetween, webs connecting said second circumferential wall and said elongated walls to form recirculated air passageways between said second and first circumferential walls and between said second circumferential wall and said elongated walls, said second circumferential wall having axially extending corrugations therein projecting inwardly therefrom and toward said first circumferential wall, and means for causing circulation through said passageways.

6. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of spaced elongated axially extending walls disposed between said circumferential walls and spaced therefrom, radial walls connecting said first circumferential wall with said elongated walls to form fresh air passageways therebetween, webs connecting said second circumferential wall and said elongated walls to form recirculated air passageways between said second and first circumferential walls and between said second circumferential wall and said elongated walls, said second circumferential wall having axially extending corrugations therein projecting inwardly therefrom and being disposed in the space between the fresh air passageways.

7. In a dynamoelectric machine, a rotor, a stator encircling said rotor, an annular frame encircling said stator, said frame having a circumferential wall disposed adjacent said stator and another circumferential wall encircling said first circumferential wall and spaced therefrom, a plurality of spaced elongated axially extending walls disposed between said circumferential walls and spaced therefrom, radial walls connecting said first circumferential wall with said elongated walls to form fresh air passageways therebetween, webs connecting said second circumferential wall and said elongated walls to form T-shaped recirculated air passageways, said passageways having portions disposed between the fresh air passageways and portions extending about the fresh air passageways, and means for causing circulation through said passageways.

8. In a dynamoelectric machine, a rotor, a stator encircling said rotor, one thereof having axially extending openings therethrough, a housing having a compartment enclosing said stator and rotor and comprising an annular frame encircling said stator, said frame having axially extending recirculated air passageways and juxtaposed fresh air passageways therein, an end bell at one end of the frame and forming therewith an end chamber communicating with said compartment, a second end bell at the other end of the frame and forming therewith a second end chamber communicating with said compartment, said recirculated air passageways communicating with said end chambers, said stator having windings overhanging said rotor, an exciter disposed interiorly of said dynamoelectric machine, a portion of said exciter lying within the confines of said windings, said exciter having openings therein communicating with the openings in said dynamoelectric machine, means for supporting said exciter within said dynamoelectric machine, a blower revoluble with said rotor and disposed in one of said end chambers, said blower causing circulation of air within the interior of said dynamoelectric machine through said recirculated air passageways and through the openings in said dynamoelectric machine and exciter, said windings of said stator assisting in directing the air through said rotor, and means for causing circulation of air exteriorly of the said housing and through said fresh air passageways.

9. In a dynamoelectric machine, a rotor, a stator encircling said rotor, one thereof having axially extending openings therethrough, a housing having a compartment enclosing said stator and rotor and comprising an annular frame encircling said stator, said frame having axially extending recirculated air passageways and juxtaposed fresh air passageways therein, an end bell at one end of the frame and forming therewith an end chamber communicating with said compartment, a second end bell at the other end of the frame and forming therewith a second end chamber communicating with said compartment, said recirculated air passageways communicating with said end chambers, an exciter disposed interiorly of said dynamoelectric machine, said exciter having axially extending openings therethrough and including a stator carried by one of said end bells, an armature and a commutator connected therewith, brush-supporting means carried by said end bell, brushes supported by said brush-supporting means and coacting with said commutator, current collecting means for said dynamoelectric machine including other brushes, said second named brushes being also supported by said brush-supporting means and being disposed in close proximity to said first named brushes, a blower revoluble with said rotor and disposed in one of said chambers, said blower causing circulation of air within the interior of said dynamoelectric machine through said recirculated air passageways and through the openings in said dynamoelectric machine and exciter and past said brushes, and means for causing circulation of air exteriorly of the said housing and through said fresh air passageways.

10. In a dynamoelectric machine, a shaft, an electrical unit including a rotor mounted on said shaft and a stator encircling said rotor, a housing having a partition forming therein a compartment for the reception of said stator and rotor and an end chamber, said partition having an opening therein, an exciter having a stator and a rotor carried by said shaft, said exciter stator extending up to said partition and being disposed adjacent said opening, brushes disposed in said end chamber, air impelling means mounted on said shaft, ducts formed in said housing and directing air from the air impelling means and into said end chamber, said exciter and electrical unit having axially extending openings therethrough for conducting the air entering the chamber back to the air impelling means.

11. In a dynamoelectric machine, a shaft, an electrical unit including a rotor mounted on said shaft and a stator encircling said rotor, a housing having a partition forming therein a compartment for the reception of said stator and rotor and an end chamber, said partition having an opening therein, a second electrical unit including a rotor on said shaft and a stator encircling said rotor, the stator of said second electrical unit extending up to said partition and being disposed adjacent said opening, brushes disposed in said end chamber, air impelling means mounted on said shaft, ducts formed in said housing and directing air from the air impelling means and into said end chamber, said electrical units having axially extending openings therethrough for conducting the air entering the chamber back to the air impelling means.

12. In a dynamoelectric machine, a rotary electrical unit, a housing having a compartment for the reception of said unit, an end chamber at one end of the compartment and communicating therewith and an end chamber at the other end of said compartment, said housing being formed with an opening bringing said second named end chamber into communication with said compartment, a second rotary electrical unit extending across said opening and through which air may pass from the adjacent end chamber to said compartment, air impelling means in said first end chamber and means in said housing forming air ducts for conducting air from said air impelling means and into said second air chamber to force air through said second unit and to said first unit.

GUSTAV A. CLAUSON.
RUPERT N. EARLY.

REFERENCES CITED

The following references are of record in the file of this patent:

UNITED STATES PATENTS

| Number | Name | Date |
| --- | --- | --- |
| 771,468 | Falk | Oct. 4, 1904 |
| 1,320,781 | Mossay | Nov. 4, 1919 |
| 1,342,179 | Mossay et al. | June 1, 1920 |
| 1,386,934 | Jacoby | Aug. 9, 1921 |
| 1,884,573 | Chapman | Oct. 25, 1932 |
| 2,043,655 | Ehrmann | June 9, 1936 |
| 2,185,728 | Fechheimer | Jan. 2, 1940 |
| 380,115 | Heisler | Mar. 27, 1888 |
| 2,179,561 | Oesterlein | Nov. 14, 1939 |

FOREIGN PATENTS

| Number | Country | Date |
| --- | --- | --- |
| 498,366 | Great Britain | Jan. 6, 1939 |
| 812,406 | France | Feb. 1, 1937 |
| 372,957 | Great Britain | May 19, 1932 |